(12) United States Patent
Kim

(10) Patent No.: US 7,323,123 B2
(45) Date of Patent: Jan. 29, 2008

(54) METHOD OF FABRICATING LIGHT-GUIDE PLATE

(75) Inventor: Jae Bum Kim, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 560 days.

(21) Appl. No.: 10/742,755

(22) Filed: Dec. 23, 2003

(65) Prior Publication Data

US 2004/0227262 A1 Nov. 18, 2004

(30) Foreign Application Priority Data

Feb. 25, 2003 (KR) ........................ 10-2003-0011763

(51) Int. Cl.
*B29D 11/00* (2006.01)
(52) U.S. Cl. .................. 264/1.24; 264/2.5; 216/24; 425/808
(58) Field of Classification Search .............. 264/1.1, 264/1.24, 1.31, 25; 425/808, 810; 216/24, 216/26
See application file for complete search history.

(56) References Cited

U.S. PATENT DOCUMENTS 7,048,428 B2 * 5/2006 Tahara et al. .............. 362/626

2003/0156328 A1 * 8/2003 Goto et al. .............. 359/599

FOREIGN PATENT DOCUMENTS

| KR | 2003061207 | * | 7/2003 |
| TW | 537955 | * | 1/2002 |

* cited by examiner

*Primary Examiner*—Mathieu D. Vargot
(74) *Attorney, Agent, or Firm*—Morgan, Lewis & Bockius LLP

(57) ABSTRACT

A method of fabricating a light-guide plate includes preparing an upper mold frame having an inclined inner surface and a lower mold frame having a space therein, preparing a micro pattern plate having a surface including one of a plurality of grooves and a plurality of protrusions formed using photolithographic processes, inserting the micro pattern plate into the space of the lower mold frame, the surface of the micro pattern plate facing the inclined inner surface of the upper mold frame, positioning the upper and lower mold frames together, and injecting light-guide plate forming material into a space between the upper and lower mold frames.

13 Claims, 18 Drawing Sheets

METHOD OF FABRICATING LIGHT-GUIDE PLATE

The present invention claims the benefit of Korean Patent Application No. P2003-11763 filed in Korea on Feb. 25, 2003, which is hereby incorporated by reference.

BACKGROUND OF THE INVENTION

1. Field of the Invention

The present invention relates to a method of fabricating a light-guide plate, and more particularly, to a method of fabricating a light-guide plate for a liquid crystal display module.

2. Description of the Related Art

In general, liquid crystal display (LCD) devices display images using an external light source. FIG. 1 is a schematic cross sectional view of a liquid crystal display module according to the related art. In FIG. 1, a liquid crystal display module includes a main support 2, a backlight unit and a liquid crystal display panel 10 stacked inside the main support 2, a bottom cover 14 enclosing bottom and side surfaces of the main support 2, and a case top 16 for enclosing edges of the liquid crystal display panel 10 and the bottom cover 14.

The main support 2 is a molded part and side surface of an inner wall of the main support 2 is formed to have a step portion. In addition, a backlight unit is installed on the inner bottom portion of the main support 2, and the liquid crystal display panel 10 is mounted above the backlight unit.

The liquid crystal display panel 10 includes a lower substrate 10b upon which switching devices, such as thin film transistors TFT are installed, an upper substrate 10a upon which color filters are installed, and a liquid crystal material injected into a space between the upper substrate 10a and the lower substrate 10b. Polarizing plates 22 and 24 are installed above and below the liquid crystal display panel 10, wherein the lower polarizing plate 22 polarizes light coming from the back light unit and guides the polarized light to the liquid crystal display panel 10. The upper polarizing plate 24 polarizes the polarized light coming through the liquid crystal display panel 10 and transmits the doubly-polarized light.

The bottom cover 14 is installed to enclose the bottom and side surfaces of the main support 2. In addition, the case top 16 is installed to enclose the upper and side portions of the main support 2 to affix the main support 2 and the liquid crystal display panel 10 together.

The backlight unit includes a lamp housing 18 accommodating a light source 20, a light-guide plate 6 for transforming the incident light emitted from the light source 20 into planar light, optical sheets 12 attached onto the light-guide plate 6 for increasing efficiency of the light incident to the liquid crystal display panel 10, and a reflection plate attached onto a rear surface of the light-guide plate 6 for reflecting the light transmitted from the back of the light-guide plate 6 to the liquid crystal display panel 10.

The light source 20 supplies amounts of light to the light-guide plate 6 in response to an extremely supplied power. Accordingly, the light radiated to the opposite direction of the light-guide plate 6 is reflected toward the light-guide plate 6 by the lamp housing 18, and the reflection plate 4 reflects the light incident to the lower part of the light-guide plate 6. Thus, the reflection plate 4 guides the incident light from the light-guide plate 6 toward the liquid crystal display panel 10.

The optical sheets 12 include upper and lower diffusion sheets and upper and lower prism sheets. The optical sheets scatter the light incident from the light-guide plate 6 to distribute the lights evenly over an entire surface of the light-guide plate 6. In addition, the optical sheets 12 increase surface brightness by refracting and collecting the scattered light, thereby widen a viewing angle by diffusing the light.

FIG. 2 is a cross sectional view of the light-guide plate of FIG. 1 according to the related art. In FIG. 2, a plurality of protrusions 30 are formed on a rear surface of the light-guide plate 6 to reflect the incident light and to uniformly distribute the light and guide the light toward the liquid crystal display panel 10.

FIG. 3 is a cross sectional view of a mold frame used to mold the light-guide plate of FIG. 2 according to the related art. In FIG. 3, a plurality of grooves 36 are formed within designated intervals on a lower mold frame 32 in order to create the plurality protrusions 30. Then, an upper mold frame 34 is provided to have an inclined inner surface. Next, a light-guide plate forming material, such as polymethyl methacrylate (PMMA), is inserted between the upper and lower mold frames 34 and 32, and the light-guide plate 6 is formed, as shown in FIG. 2.

However, during the process for forming the light-guide plate 6, since a plurality of grooves 36 are directly formed on the lower plate, it is difficult for the intervals between the protrusions 30 to be less than or equal to 10 μm. Similarly, the interval between the protrusions 30 is formed to be greater than or equal to 10 μm. Accordingly, the protrusions 30, where the interval between the protrusions is greater than or equal to 10 μm, are limited in the amount of light reflected therefrom, and result in lowering the uniformity of light and making it be difficult to implement high light brightness.

SUMMARY OF THE INVENTION

Accordingly, the present invention is directed to a method of fabricating a light-guide plate that substantially obviates one or more of the problems due to limitations and disadvantages of the related art.

An object of the present invention is to provide a method of fabricating a light-guide plate having micro-sized patterns to improve brightness of a liquid crystal display.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a light-guide plate includes preparing an upper mold frame having an inclined inner surface and a lower mold frame having a space therein, preparing a micro pattern plate having a surface including one of a plurality of grooves and a plurality of protrusions formed using photolithographic processes, inserting the micro pattern plate into the space of the lower mold frame, the surface of the micro pattern plate facing the inclined inner surface of the upper mold frame, positioning the upper and lower mold frames together, and injecting light-guide plate forming material into a space between the upper and lower mold frames.

It is to be understood that both the foregoing general description and the follow detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 4A to 4J are cross sectional views of exemplary process steps of a method of fabricating a micro pattern plate according to the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
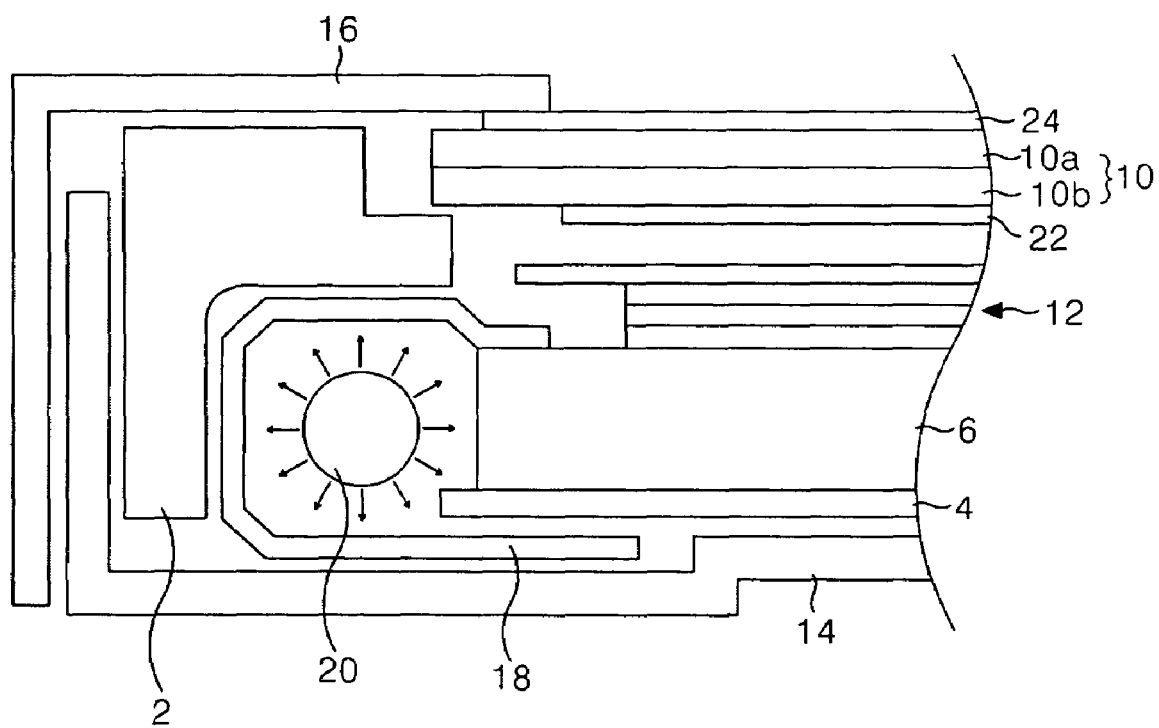
FIG. 1 is a schematic cross sectional view of a liquid crystal display module according to the related art.
Figure 2:
FIG. 2 is a cross sectional view of the light-guide plate of FIG. 1 according to the related art.
Figure 3:
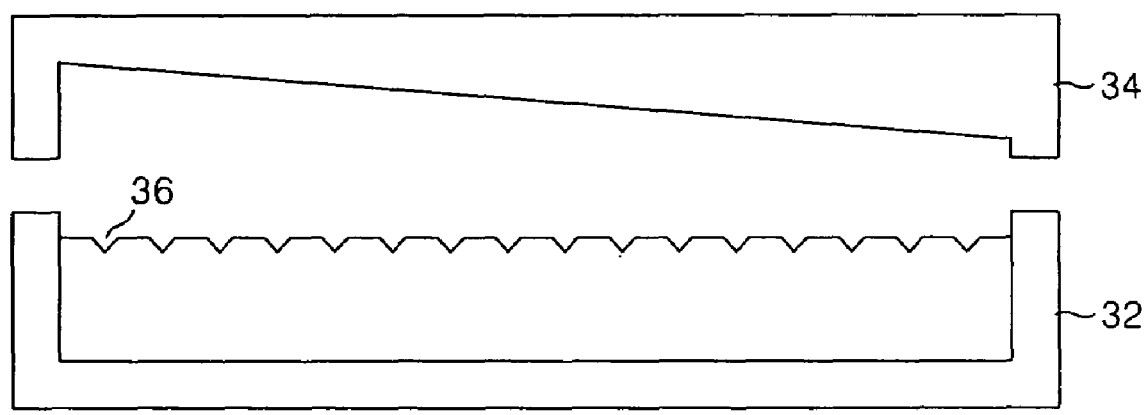
FIG. 3 is a cross sectional view of a mold frame used to mold the light-guide plate of FIG. 2 according to the related art.
Figure 4A:

FIGS. 4A to 4J are cross sectional views of exemplary process steps of a method of fabricating a micro pattern plate according to the present invention. In FIG. 4A, a plate 40, such as copper (Cu), for micro-sized patterns may be prepared.

Figure 4B:
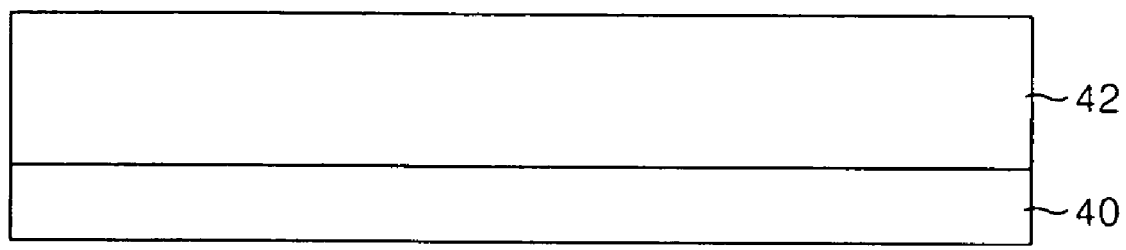

In FIG. 4B, an organic insulating material 42 may be deposited onto the plate 40. The organic insulating material may be one of benzocyclobutene (BCB), perfluorocyclobutane (PFCB), and the like.

Figure 4C:
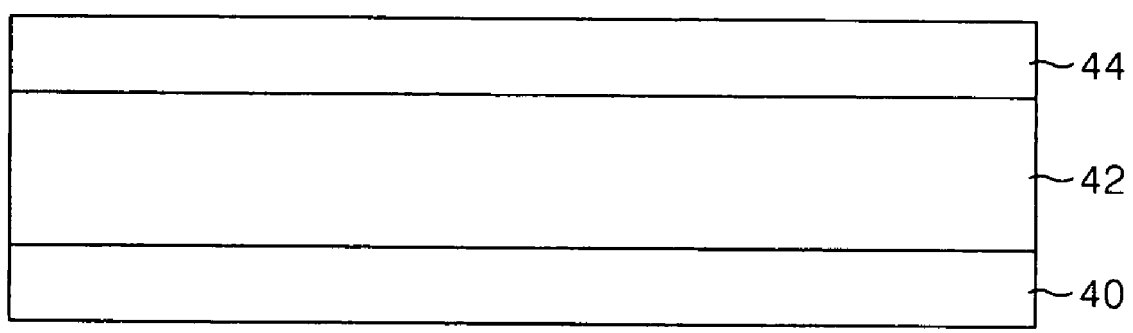

In FIG. 4C, a photoresist (PR) 44 may be applied onto the organic insulating material 42.

Figure 4D:
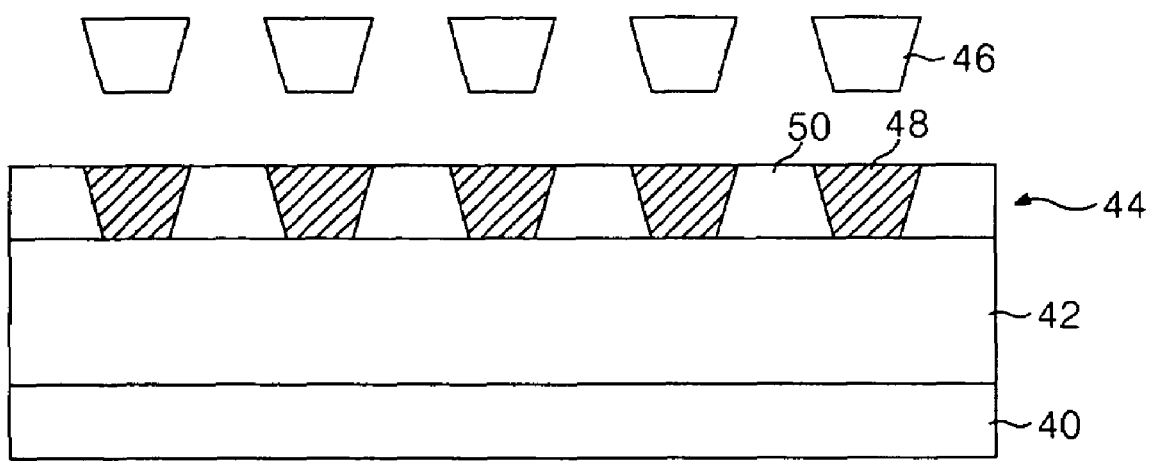

In FIG. 4D, the PR 44 may be exposed using a plurality of masks 46. A cross-section of the mask 46 may resemble a trapezoid, wherein two sides are of equal length and the side facing the PR is shorter than the opposite side. In addition, an interval between the masks 46 may be regulated to set an interval between protrusions or grooves to be formed less than or equal to about 9 µm.

After the masks 46 are aligned onto the PR 44, irradiation of ultraviolet (UV) light may divide the PR 44 into two different types of regions, i.e., irradiated region 50 and non-irradiated region 48.

Figure 4E:
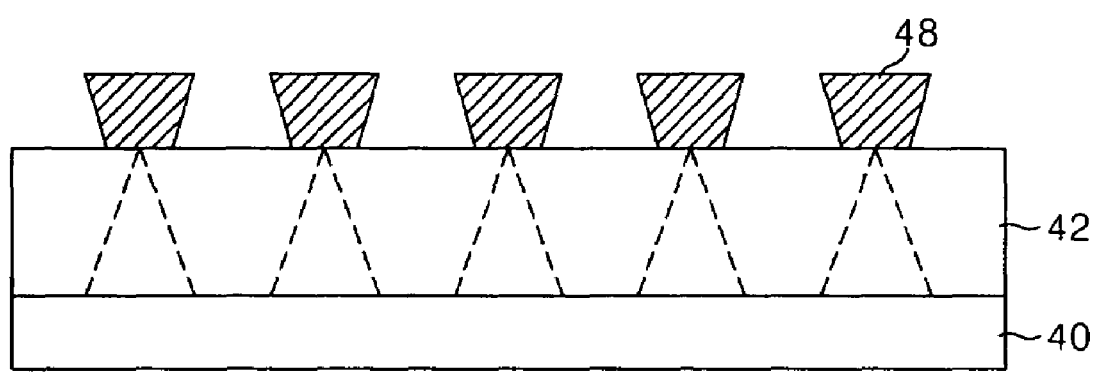

In FIG. 4E, the PR 44 may be developed to remove the irradiated region 50. Accordingly, only the non-irradiated regions 48 may remain on the organic insulating material 42. The non-irradiated regions 48 may have two sides of equal length and an upper surface that may be wider than a lower surface.

Figure 4F:
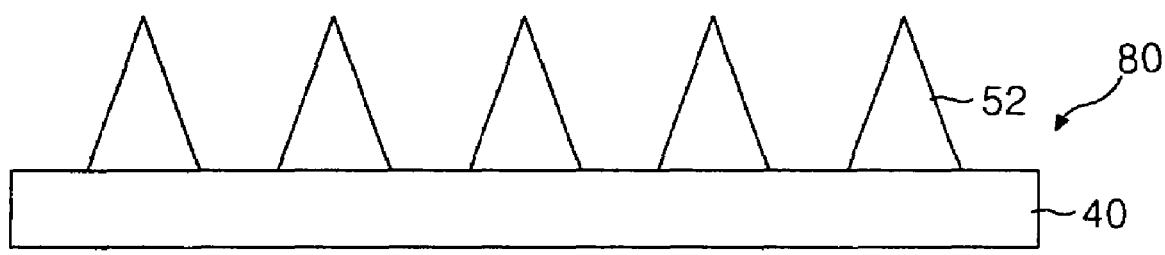

In FIG. 4F, the organic insulating material 42 may be anisotropically etched so that triangular protrusions 52 remain on the plate 40. Thus, producing a micro patterned plate 80.

Figure 7:
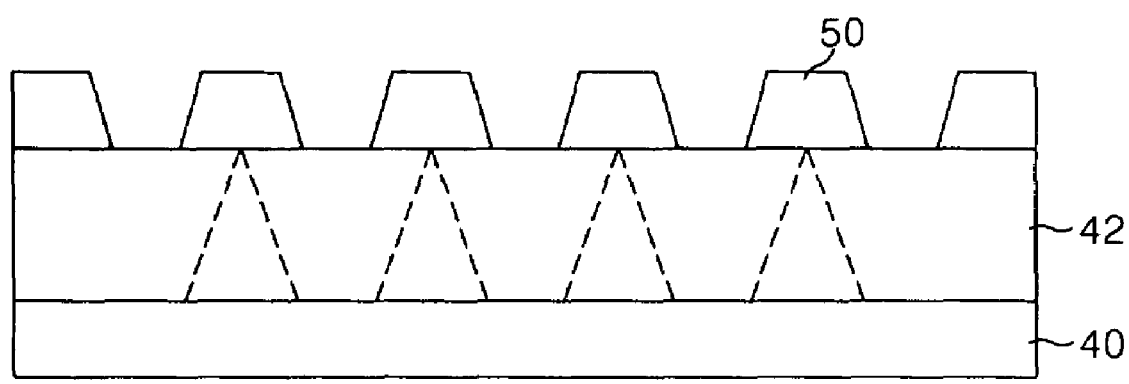
FIG. 7 is a cross sectional view of an exemplary photoresist of FIG. 4D according to the present invention.

Alternatively, the PR 44 may be formed by removing the non-irradiated regions 48, as shown in FIG. 7. Accordingly, only the irradiated regions 48 may remain on the organic insulating material 42. The irradiated regions 48 may have two sides of equal length and an upper surface may be narrower than a lower surface. Then, as shown in FIG. 4F, the organic insulating material 42 may be anisotropically etched so that the triangular protrusions 52 remain on the plate 40.

Figure 4G:
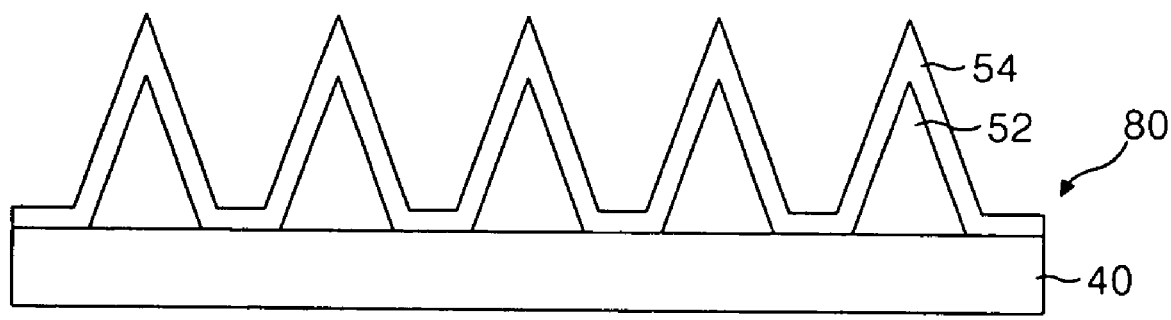

In FIG. 4G, a copper film 54 may be plated onto the micro patterned plate 80 including the triangular protrusions 52 and the plate 40. The copper plating contributes to increasing a strength of the protrusions 52 and maintains a uniform surface roughness of the triangular protrusions 52. In addition, intervals between the triangular protrusions 52 may be set to be less than or equal to about 9 µm, for example, about 0.5 µm. Thus, since the triangular protrusions 52 may be formed using photolithographic processes capable of regulating a gap between the masks 52, the intervals between the triangular protrusions 52 may be set to be small. The micro pattern plate 80 resulting from the processes of FIGS. 4A to 4G may be used to form a depressed engraving pattern.

Figure 5A:
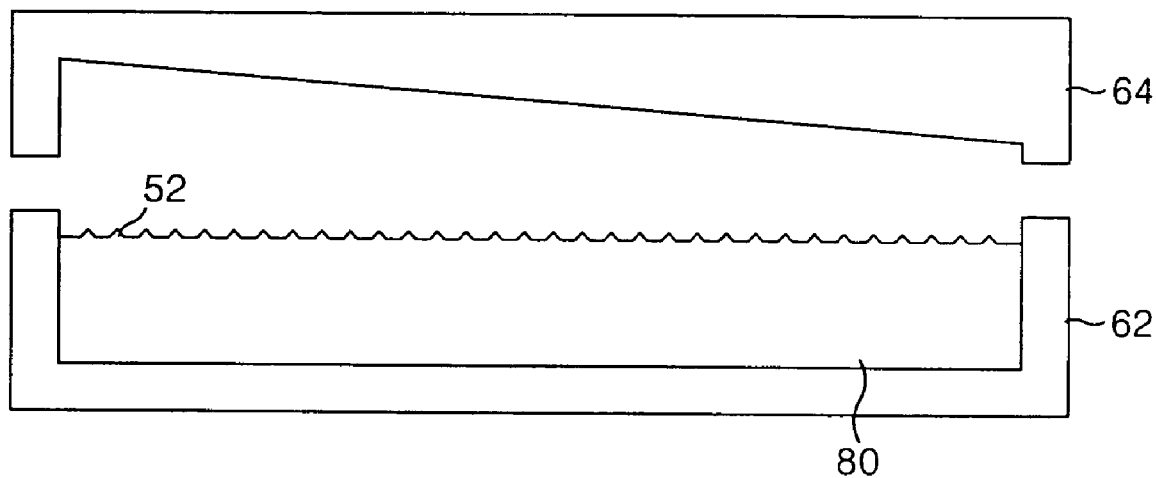
FIGS. 5A and 5B are cross sectional views of an exemplary method of fabricating a light-guide plate according to the present invention.
Figure 5B:
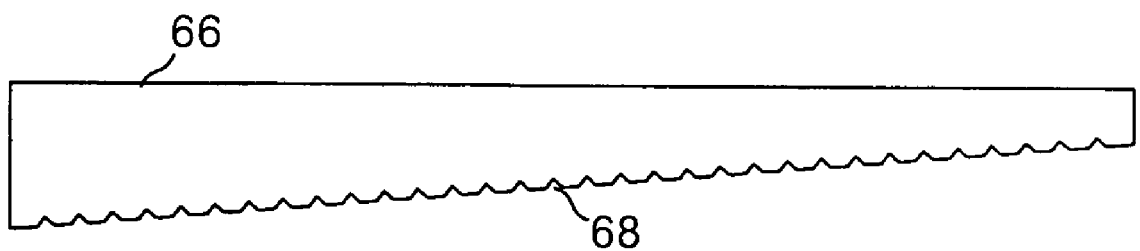

FIGS. 5A and 5B are cross sectional views of an exemplary method of fabricating a light-guide plate according to the present invention. In FIG. 5A, the micro pattern plate 80 having densely formed protrusions 52 may be inserted into a lower mold frame 62. Then, an upper mold frame 64 may be provided have an inclined inner surface so as to form a light-guide plate having a designated slope. After the micro pattern plate 80 is inserted into the lower mold frame 62, light-guide plate forming material, such as polymethyl methacrylate (PMMA), may be injected into a space between the lower and upper mold frames 62 and 64. Accordingly, a light-guide plate 66 having a depressed engraving pattern, i.e. grooves 68 with designated intervals, may formed, as shown FIG. 5B. Here, the intervals between the grooves 68 on the light-guide plate 66 may be set to correspond to the intervals between the protrusions 52 on the micro pattern plate 80. Consequently, since the intervals between the grooves 68 on the light-guide plate may be set to be less than or equal to about 9 µm, i.e., about 0.5 µm, the light-guide plate may contribute to increase the uniformity of light and achieve high ligth brightness.

Figure 4H:
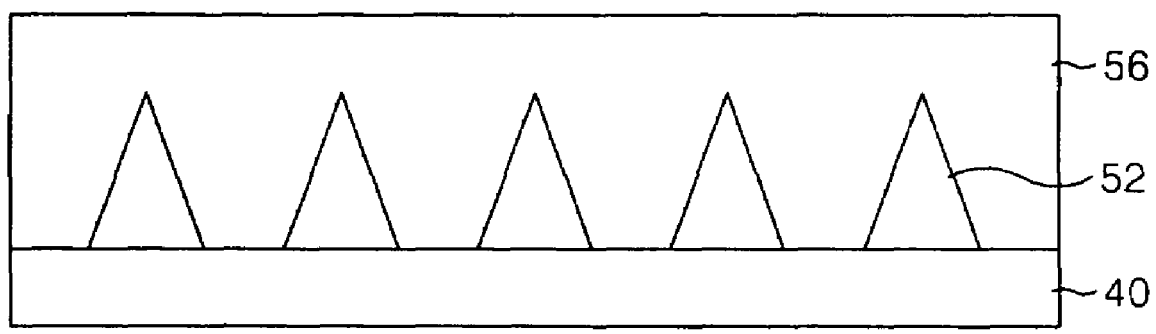
Figure 41:
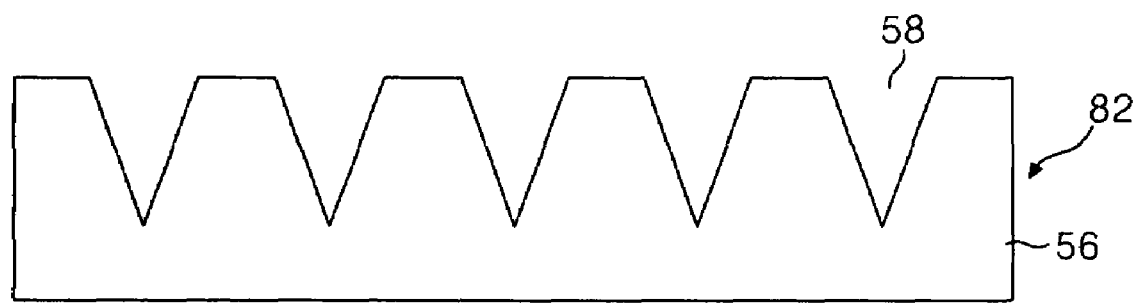
Figure 4J:
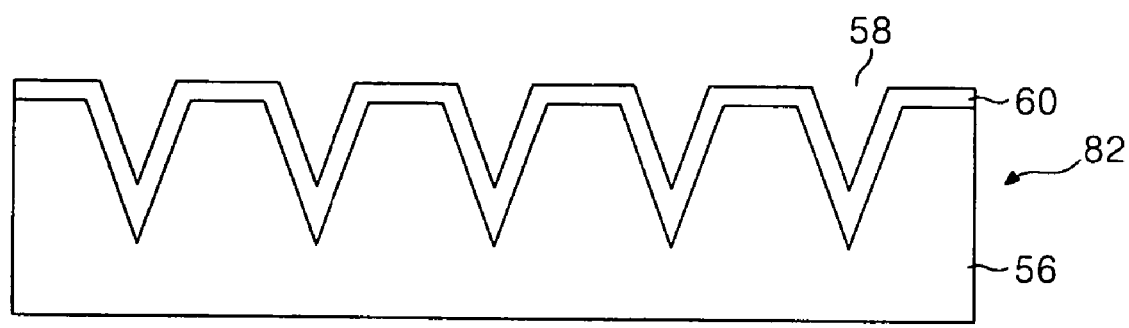

On the other hand, additional processes in FIGS. 4H to 4J may be used to fabricate a light-guide plate having a raised carving pattern. After the protrusions 52 on the plate 40 are formed, as shown in FIG. 4F, micro pattern forming material 56 may be deposited on the plate 40. For example, copper, nickel, or the like may be used for the micro pattern forming material 56.

In FIG. 4I, a micro pattern plate 82 may be formed by removing the micro pattern forming material 56 from the plate 40. Accordingly, the intervals between the grooves 58 on the micro pattern plate 82 may be set to be less than or equal to about 9 µm, for example about 0.5 µm.

Figure 6A:
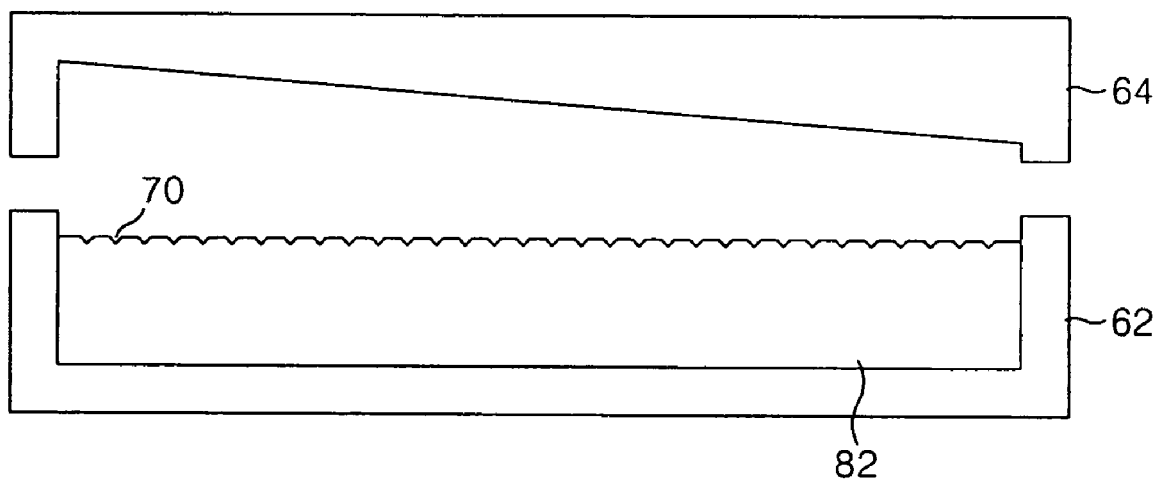
FIGS. 6A and 6B are cross sectional views of another exemplary method of fabricating a light-guide plate according to the present invention.
Figure 6B:
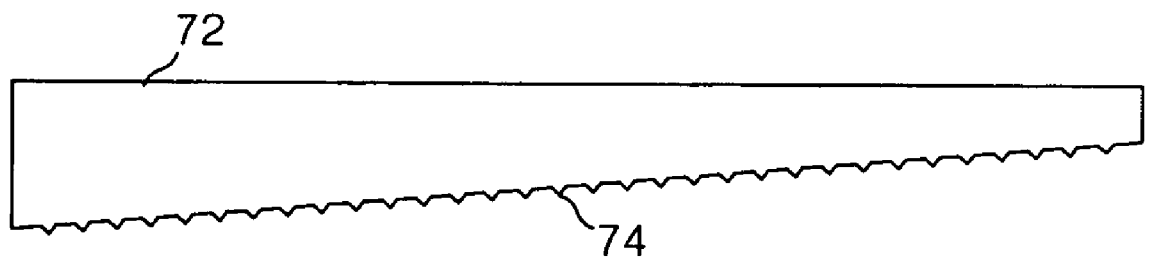

FIGS. 6A and 6B are cross sectional views of another exemplary method of fabricating a light-guide plate according to the present invention. In FIG. 6A, the micro pattern plate 82 having protrusions 70 with the intervals may be inserted into a lower mold frame 62. In addition, a upper mold frame 64 may be provided having an inclined inner surface so as to form a light-guide plate having a designated slope. After the micro pattern plate 82 is inserted into the lower mold frame 62, light-guide plate forming material, such as polymethyl methacrylate (PMMA), may be injected into a space between the lower and upper mold frames 62 and 64. Accordingly, a light-guide plate 72 having raised carving pattern, i.e. protrusions 74 with designated intervals, may be formed, as shown FIG. 6B. In addition, the intervals between the protrusions 74 on the light-guide plate 72 may be set to correspond to the intervals between the grooves 70 on the micro pattern plate 82. Consequently, since the intervals between the protrusions 74 on the light-guide plate 72 may be set to be less than or equal to about 9 μm, for example about 0.5 μm, the light-guide plate 72 may contribute to increase the uniformity of light and achieve high light brightness. For example, the densely formed protrusions 74 may reflect large amounts of light, thereby increasing the uniformity of light.

In FIG. 4J, thin copper film 60 may be applied over an entire surface of the micro pattern plate 82. The copper film 60 may contribute to increase the strength of the micro pattern plate 82 and maintain a uniform surface roughness of the grooves 58.

According to the present invention, a micro pattern plate having a plurality of densely formed grooves or protrusions may be formed using photolithographic processes. Thus, a light-guide plate having a raised carving or depressed engraving pattern may be formed using the micro pattern plate. Since the grooves or protrusions of the micro pattern plate may be formed using photolithographic processes, a raised carving or depressed engraving pattern on the light-guide plate may have a micro pattern, thereby enhancing brightness of a liquid crystal display.

It will be apparent to those skilled in the art that various modifications and variations can be made in the method of fabricating a light guide plate of the present invention without departing from the spirit or scope of the invention. Thus, it is intended that the present invention cover the modifications and variations of this invention provided they come within the scope of the appended claims and their equivalents.

What is claimed is:

1. A method of fabricating a light-guide plate, comprising steps of:
   preparing an upper mold frame having an inclined inner surface and a lower mold frame having a space therein;
   preparing a micro pattern plate having a surface including one of a plurality of grooves and a plurality of protrusions formed using photolithographic processes;
   inserting the micro pattern plate into the space of the lower mold frame, the surface of the micro pattern plate facing the inclined inner surface of the upper mold frame;
   positioning the upper and lower mold frames together; and
   injecting light-guide plate forming material into a space between the upper and lower mold frames,
   wherein the step of preparing the micro pattern plate includes:
   preparing a plate for a micro pattern;
   depositing an organic insulating layer on the plate;
   applying a photoresist onto the organic insulating layer;
   aligning a mask on the photoresist, the mask having a trapezoidal cross section in which two sides are of equal length and a side facing the PR is shorter than an opposite side;
   exposing portions of the photoresist to ultra violet light;
   developing the exposed portions of the photoresist to provide a plurality of remaining portions of the photoresist;
   forming a plurality of triangular protrusions on the plate by anisotropically etching the organic insulating layer using the remaining portions of the photoresist; and
   plating the plate and the triangular protrusions with copper.

2. The method according to claim 1, wherein the light-guide plate forming material includes polymethyl methacrylate (PMMA).

3. The method according to claim 1, wherein an interval between adjacent ones of the grooves on the micro pattern plate is less than or equal to about 9 μm.

4. The method according to claim 3, wherein the interval between the grooves is equal to about 0.5 μm.

5. The method according to claim 3, wherein the light-guide plate has a raised carving pattern corresponding to the grooves is formed.

6. The method according to claim 1, wherein an interval between adjacent ones of the protrusions on the micro pattern plate is less than or equal to about 9 μm.

7. The method according to claim 6, wherein the intervals between the protrusions is equal to about 0.5 μm.

8. The method according to claim 6, wherein the light-guide plate has a depressed engraving pattern corresponding to a plurality of the protrusions is formed.

9. The method according to claim 1, wherein the organic insulating layer includes one of benzocyclobutene (BCB) and perfluorocyclobutane (PFCB).

10. A method of fabricating a light-guide plate, comprising steps of:
   preparing an upper mold frame having an inclined inner surface and a lower mold frame having a space therein;
   preparing a micro pattern plate having a surface including one of a plurality of grooves and a plurality of protrusions formed using photolithographic processes;
   inserting the micro pattern plate into the space of the lower mold frame, the surface of the micro pattern plate facing the inclined inner surface of the upper mold frame;
   positioning the upper and lower mold frames together; and
   injecting light-guide plate forming material into a space between the upper and lower mold frames,
   wherein the step of preparing the micro pattern includes:
   preparing a plate;
   depositing an organic insulating layer on the plate;
   coating the organic insulating layer with a photoresist;
   aligning a mask on the photoresist, the mask having a trapezoidal cross section in which two sides are of equal length and a side facing the photoresist is shorter than an opposite side;
   exposing portions of the photoresist to ultra violet light;
   developing the exposed portions of the photoresist to provide a plurality of remaining portions of the photoresist;
   forming a plurality of triangular protrusions on the plate by anisotropically etching the organic insulating layer using the remaining portions of the photoresist;
   depositing a micro pattern forming material on the plate and the triangular protrusions; and removing the plate and the triangular protrusions thereby forming the micro pattern plate from the micro pattern forming material.

11. The method according to claim 10, wherein the organic insulating layer includes one of benzocyclobutene (BCB) and perfluorocyclobutane (PFCB).

12. The method according to claim 10, wherein the micro pattern forming material includes one of copper and nickel.

13. The method according to claim 10, wherein the step of preparing the micro pattern plate includes plating the forming material after the step of removing the plate and the triangular protrusions.

* * * * *